(12) United States Patent
Li (10) Patent No.: US 12,463,464 B2
(45) Date of Patent: Nov. 4, 2025

(54) MAGNETICS CONFIGURATIONS FOR WIRELESS POWER TRANSFER AND COMMUNICATIONS IN ELECTRONIC DEVICE

(71) Applicant: Apple Inc., Cupertino, CA (US)

(72) Inventor: Ye Li, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 745 days.

(21) Appl. No.: 17/652,840

(22) Filed: Feb. 28, 2022

(65) Prior Publication Data

US 2022/0320904 A1  Oct. 6, 2022

Related U.S. Application Data

(60) Provisional application No. 63/167,795, filed on Mar. 30, 2021.

(51) Int. Cl.
*H02J 50/10* (2016.01)
*H01F 27/24* (2006.01)
(Continued)

(52) U.S. Cl.
CPC .............. *H02J 50/10* (2016.02); *H01F 27/24* (2013.01); *H01F 27/28* (2013.01); *H02J 7/0044* (2013.01);
(Continued)

(58) Field of Classification Search
CPC .......... H02J 50/10; H02J 50/90; H02J 7/0044; H04B 5/79; H04B 5/26; H01F 27/24; H01F 27/28
See application file for complete search history.

(56) References Cited

U.S. PATENT DOCUMENTS 9,409,490 B2   8/2016   Kawashima
9,577,449 B2   2/2017   Hoover
(Continued)

FOREIGN PATENT DOCUMENTS

CN   111009974 A   4/2020
CN   111031441 A   4/2020
(Continued)

OTHER PUBLICATIONS

International Search Report for PCT Application No. PCT/US2022/018142 dated Jun. 13, 2022; 13 pgs.
(Continued)

*Primary Examiner* — Junpeng Chen
(74) *Attorney, Agent, or Firm* — FLETCHER YODER PC (57) ABSTRACT

A device can include a wireless power transfer coil couplable to a complementary wireless power transfer coil of another device. The device can further include wireless power transmitting and/or receiving circuitry. The device can still further include a processing and communications system, and a wireless communications coil coupled to the processing and communications system. The communications coil can include a winding magnetically couplable to a corresponding communications coil of the complementary device to allow communications between the processing and communications system and the complementary device. The wireless communications coil can be separated from the power transfer coil along a longitudinal axis of the device.

11 Claims, 6 Drawing Sheets

(51) Int. Cl.
*H01F 27/28* (2006.01)
*H02J 7/00* (2006.01)
*H02J 50/90* (2016.01)
*H04B 5/26* (2024.01)
*H04B 5/79* (2024.01)

(52) U.S. Cl.
CPC ............... *H02J 50/90* (2016.02); *H04B 5/26* (2024.01); *H04B 5/79* (2024.01)

(56) References Cited

U.S. PATENT DOCUMENTS

| | | |
|---|---|---|
| 10,003,217 B2 | 6/2018 | Kuerschner et al. |
| 10,141,783 B2 | 11/2018 | Ogawa et al. |
| 10,144,302 B2 | 12/2018 | Samuelsson et al. |
| 10,148,117 B2 | 12/2018 | Lethellier et al. |
| 10,336,197 B2 | 7/2019 | Kotani et al. |
| 10,340,078 B2 | 7/2019 | Widmer et al. |
| 10,354,794 B2 | 7/2019 | Budhia et al. |
| 10,358,045 B2 | 7/2019 | Budhia et al. |
| 10,361,591 B2 | 7/2019 | Widmer et al. |
| 10,374,460 B2 | 8/2019 | Oshima et al. |
| 10,377,254 B2 | 8/2019 | Niizuma |
| 10,399,448 B2 | 9/2019 | Seong et al. |
| 10,404,100 B2 | 9/2019 | Werner |
| 10,446,316 B2 | 10/2019 | Furiya et al. |
| 10,566,839 B2 | 2/2020 | Widmer et al. |
| 10,574,082 B2 | 2/2020 | Yamaguchi et al. |
| 10,608,441 B2 | 3/2020 | Tillotson et al. |
| 2011/0025264 A1 | 2/2011 | Mochida et al. |
| 2014/0168019 A1 | 6/2014 | Hirobe |
| 2016/0111208 A1 | 4/2016 | Park et al. |
| 2016/0126639 A1* | 5/2016 | Kim ................. H04W 4/80 307/104 |
| 2017/0047791 A1 | 2/2017 | Jang et al. |
| 2017/0093454 A1 | 3/2017 | Chawan |
| 2017/0149286 A1* | 5/2017 | Joye ................. H04B 5/263 |
| 2017/0179773 A1* | 6/2017 | Kim ................. H04B 5/26 |
| 2018/0175671 A1 | 6/2018 | Ren |
| 2018/0233961 A1 | 8/2018 | Hu et al. |
| 2018/0269714 A1 | 9/2018 | Samuelsson et al. |
| 2018/0309327 A1* | 10/2018 | Miyamoto ............. H02J 50/70 |
| 2019/0027954 A1 | 1/2019 | Lee et al. |
| 2019/0028149 A1 | 1/2019 | Pifferi |
| 2019/0108940 A1 | 4/2019 | Ngahu et al. |
| 2019/0214719 A1 | 7/2019 | Lee et al. |
| 2019/0393733 A1 | 12/2019 | Radchenko et al. |
| 2020/0013549 A1 | 1/2020 | Samuelsson |
| 2020/0039368 A1 | 2/2020 | Sieber et al. |
| 2020/0094700 A1 | 3/2020 | Hui |
| 2021/0194291 A1 | 6/2021 | Yeo et al. |
| 2021/0289282 A1 | 9/2021 | Onizuka et al. |

FOREIGN PATENT DOCUMENTS

| | | |
|---|---|---|
| EP | 2474369 A1 | 4/2019 |
| JP | H08236339 A | 9/1996 |
| JP | 2009247125 A | 10/2009 |
| JP | 2019071748 A | 5/2019 |
| JP | 2019106887 A | 6/2019 |
| JP | 2019169526 A | 10/2019 |
| KR | 20170085900 A | 7/2017 |
| KR | 10-2019-0074767 A | 6/2019 |
| KR | 1020200026490 A | 3/2020 |
| KR | 1020210002004 A | 1/2021 |
| WO | 2017109799 A1 | 6/2017 |
| WO | 2019124755 A1 | 6/2019 |
| WO | 2020017128 A1 | 1/2020 |

OTHER PUBLICATIONS

Preliminary Rejection for Korean Application No. 10-2023-7031424 dated Apr. 5, 2024; 3 pgs.

Notice of Allowance for Korean Patent Application No. 10-2023-7031424, dated Sep. 26, 2024; 4 pgs.

Notice of Acceptance for Australian Patent Application No. 2022252126, dated Aug. 27, 2024; 3 pgs.

WIPS Search Report for Korean Application No. 10-2023-7031424 dated Oct. 18, 2023; 9 pgs.

Office Action for U.S. Appl. No. 17/652,829 dated Oct. 30, 2024; 15 pgs.

Notice of Allowance for U.S. Appl. No. 17/652,829 dated Mar. 7, 2025; 12 pgs.

First Non-Final Office Action for U.S. Appl. No. 17/652,834 dated Feb. 26, 2025; 64 pgs.

Notice of Allowance for U.S. Appl. No. 17/652,837, dated Apr. 1, 2025; 20 pgs.

Decision of Grant for Japanese Pat. Application No. 2023-558828, dated Feb. 7, 2025; 2 pgs.

* cited by examiner

MAGNETICS CONFIGURATIONS FOR WIRELESS POWER TRANSFER AND COMMUNICATIONS IN ELECTRONIC DEVICE

CROSS-REFERENCE TO RELATED APPLICATIONS

This application claims priority to U.S. Provisional Application No. 63/167,795, filed Mar. 30, 2021, entitled "Magnetics Configurations for Wireless Power Transfer and Communications in Electronic Device Accessories," the disclosure of which is incorporated by reference in its entirety for all purposes.

BACKGROUND

Wireless power transfer ("WPT"), sometimes also known as inductive power transfer ("IPT") has recently become more prevalent in a number of applications. One application in which WPT/IPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.).

SUMMARY

A device can include a power receiving coil configured to be magnetically coupled to a power transmitting coil of a wireless power transmitter, wireless power receiving circuitry configured to receive energy from the power receiving coil, a processing and communications system powered by the wireless power receiving circuitry, and a wireless communications coil coupled to the processing and communications system. The communications coil can include a winding configured to be magnetically coupled to a corresponding communications coil of the wireless power transmitter to allow communications between the processing and communications system and the wireless power transmitter. The wireless communications coil can be separated from the power receiving coil along a longitudinal axis of the device.

The device can be a wireless earphone, and the longitudinal axis of the device can be a longitudinal axis of a stem portion of the wireless earphone. The power receiving coil can include a hemispherical magnetic core and a winding disposed about an exterior of the hemispherical core. The power receiving coil can be configured to be disposed within a hemispherical power transmitting coil of the wireless power transmitter. The power receiving coil can be located in a distal end of the stem portion of the wireless earphone. The device can further include a shield disposed between the power receiving coil and the wireless communications coil. At least one of a height of the communications coil and a vertical separation between the communications coil and the power receiving coil can be selected to provide a desired degree of magnetic isolation therebetween.

The communications coil can include a magnetic core. The magnetic core can have a cross sectional area smaller than a cross sectional area of the winding of the communications coil and the magnetic core can be disposed within an aperture of the winding and behind the winding. The magnetic core can have a cross-sectional area greater than the cross-sectional area of the winding of the communications coil, and the winding can be disposed within a channel in the magnetic core. A vertical dimension of the communications coil along the longitudinal axis of the device can be greater than a horizontal dimension of the communications coil transverse to the longitudinal axis of the device. A vertical dimension of the communications coil along the longitudinal axis of the device can be less than a horizontal dimension of the communications coil transverse to the longitudinal axis of the device.

A device can include a power transmitting coil configured to be magnetically coupled to a power receiving coil of a wireless power receiver, wireless power transmitting circuitry configured to transmit energy via the power transmitting coil, a processing and communications system, and a wireless communications coil coupled to the processing and communications system. The communications coil can include a winding configured to be magnetically coupled to a corresponding communications coil of the wireless power receiver to allow communications between the processing and communications system and the wireless power receiver. The wireless communications coil can be separated from the power transmitting coil along a longitudinal axis of the device.

The device can be an earphone charging case, and the longitudinal axis of the device can correspond to a longitudinal axis of a stem portion of the wireless earphone. The earphone charging case can include one or more alignment features configured to position earphones relative to the case for suitable alignment of the coils. The power transmitting coil can include a hemispherical shell magnetic core and a winding disposed about an interior of the hemispherical shell. The power transmitting coil can be configured to be disposed about a hemispherical power receiving coil of the wireless power receiver. The power transmitting coil can be located in a portion of the case configured to receive a distal end of the stem portion of the wireless earphone, the device can further include a shield disposed between the power transmitting coil and the wireless communications coil. At least one of a height of the communications coil and a vertical separation between the communications coil and the power transmitting coil can be selected to provide a desired degree of magnetic isolation therebetween.

The communications coil can include a magnetic core. The magnetic core can have a cross sectional area smaller than a cross sectional area of the winding of the communications coil and the magnetic core can be disposed within an aperture of the winding and behind the winding. The magnetic core can have a cross-sectional area greater than the cross-sectional area of the winding of the communications coil, and the winding can be disposed within a channel in the magnetic core. A vertical dimension of the communications coil along the longitudinal axis of the device can be greater than a horizontal dimension of the communications coil transverse to the longitudinal axis of the device. A vertical dimension of the communications coil along the longitudinal axis of the device can be less than a horizontal dimension of the communications coil transverse to the longitudinal axis of the device.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
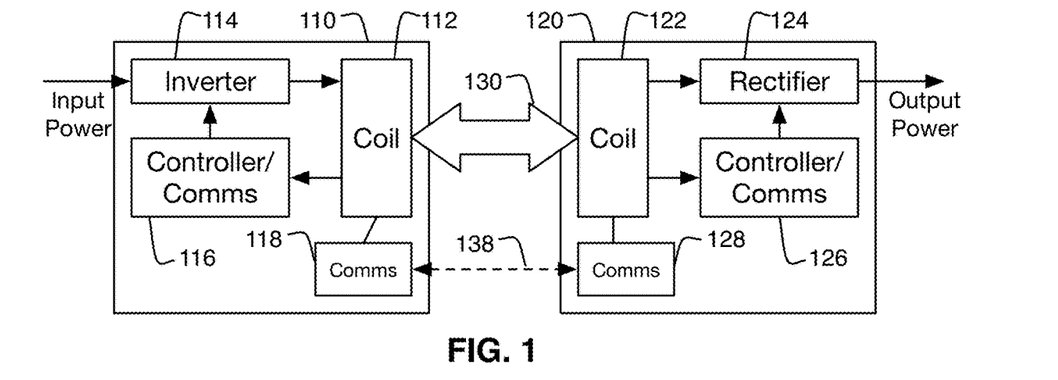
FIG. 1 illustrates a wireless power transfer system.

FIG. 1 illustrates a simplified block diagram of a wireless power transfer system 100. Wireless power transfer system includes a power transmitter (PTx) 110 that wirelessly transfers power to a power receiver (PRx) 120 via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information, and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as an winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above described wireless power transmission system 100 are possible, and the following teachings are applicable to any of such variations and enhancements.

Figure 2:
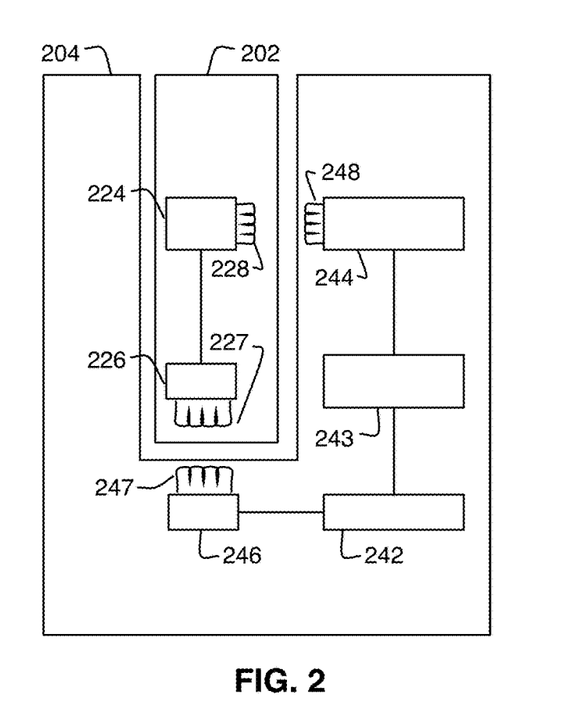
FIG. 2 is a block diagram of an exemplary application of wirelessly powered peripheral and a wireless charging case.

FIG. 2 is a block diagram of an exemplary application of wirelessly powered peripheral 202 and a wireless charging case 204. In one embodiment, the wireless peripheral can be a pair of wireless earphones. The wireless earphones may be designed so that the speaker portion is insertable into a user's ear, with a stem portion containing the other electronic components may extend therefrom. A loudspeaker may be driven with an audio signal produced by a digital to analog converter and amplified by an audio amplifier. The digital to analog converter may receive a digital audio signal from processor and communications module 224. In some embodiments, processor and communications module 224 may receive the digital audio signal from another device, such as a mobile phone, tablet computer, laptop computer, or other source via Bluetooth, WiFi, or another suitable wireless communications protocol. The corresponding radios have not been explicitly shown in the block diagram of FIG. 2, but it will be understood that such radio modules could be built into the processing and communications module or may be separate modules. The various electronic modules making up wireless earphones (or any other peripheral 202) are exemplary only, and there may be additional components (e.g., microphones) or other functional blocks included as appropriate for a given embodiment. Other permutations and combinations as well as different embodiments are also possible.

The electronic systems of wireless peripheral may be powered by an internal rechargeable battery (not shown). The battery may be charged by wireless power transfer with a wireless power receiver (PRx) 226, which can be coupled to a receive coil 227 and configured to receive wireless power from a corresponding transmitter 246 and transmit coil 247 in charging case 204. As an example, the wireless power transfer system may be constructed as described above with respect to FIG. 1. Wireless peripheral 202 may be inserted into a charging case 204, which may have one or more receptacles configured to receive peripheral 202. These receptacles may be shaped so as to receive and align peripheral 202 so that the wireless power receiver coils 227 in the wireless peripheral 202 are suitably aligned with the corresponding wireless power transmitter coils 247 in the charging case 204. This alignment may be accomplished by the shape of the receptacles (corresponding to the shape of the peripheral 202) and may be further assisted by other features, such as alignment tabs or other fixtures, magnets, or other suitable alignment devices.

Charging case 204 may include its own battery (not shown), which may provide the energy source for charging wireless peripheral 202. This battery may be charged by an external wired or wireless power source (not shown). The case battery may be coupled to a power management circuit 242 that can, in turn, provide power to wireless power transmitter 246, which may be configured to deliver power wirelessly via power transmit coil 247 to corresponding wireless peripheral power receiver coil 227 and wireless power receiver 226. Power management circuit 242 may also be coupled to case processing system 243, which may be a programmable controller configured to operate the charging case. Processing system 243 may be coupled to case communications module 244, which may be configured to provide communications between wireless charging case 204 and wireless peripheral 202. Such communications may be provided by a communications coil 248 configured to be magnetically coupled to a corresponding communications coil 228 of wireless peripheral 202 when wireless peripheral 202 is inserted into the case 204. Although the communications coils may be referred to herein as "transmitter" or "receiver" coils, all such coils may be used bidirectionally, and thus may be transmitting or receiving as the particular context and mode of operation require.

As discussed briefly above with respect to FIG. 1, some wireless power transfer systems have relied on so-called "in-band" communications in which the power delivery from the PTx to the PRx is modulated to provide communications. However, in some cases it may be desirable to provide out-of-band communications. For example, out-of-band communications may allow for higher communications bandwidth. These out-of-band communications have historically relied on radio frequencies for the physical channel. Alternatively, as described herein, magnetic induction may also be used. However, if magnetic induction is to be used for communications and for power delivery, it may be desirable to ensure that there is sufficient isolation between the power transfer path (e.g., from PTx 246 via power transmit coil 247 to power receive coil 227 and PRx 226) and the communications path (between earphone processor/comms module 224 and case comms module 244 via comms coils 228 and 248). Various embodiments for providing such isolation are described below.

In some embodiments, isolation between the magnetic circuit path used for power transfer and the magnetic circuit path used for communications between wireless charging case 204 and wireless peripheral 202 (or other wireless devices) may be achieved by providing sufficient physical separation between the power coils and the communications coils. In the case of wireless peripheral 202 configured as described above, this may, for example, include locating the wireless power receiver coil 227 near the bottom of wireless peripheral 202, with the corresponding wireless power transmitter coil 247 located at a corresponding location in the case. Similarly, peripheral communications coil 228 may be located higher in wireless peripheral 202, with corresponding case communications coil 248 located in a corresponding location in the case. For example, in the case of a wireless earphone as peripheral 202, the power receiver coil can be located near the distal end of a stem portion of the wireless peripheral, while the communications receiver coil can be located higher up in the stem portion, nearer the upper portion of the earphone that is inserted into a user's ear, or even as part of such upper portion. The illustrated configuration in which the power and communication coils are located below/above one another is merely exemplary, and any spatially separated configuration could be used without regard to directional orientation. Each of the aforementioned coils may include a winding portion, made up of a number of turns of wire, printed circuit board traces, flexible printed circuit traces, etc. Each of the aforementioned coils may also include a core made of a material having a suitable magnetic permeability, e.g., ferrite, to enhance the performance of the magnetic circuit. Described below are a series of magnetic circuit configurations employing separation between the power coils and communications coils to achieve the desired isolation.

Figure 3A:
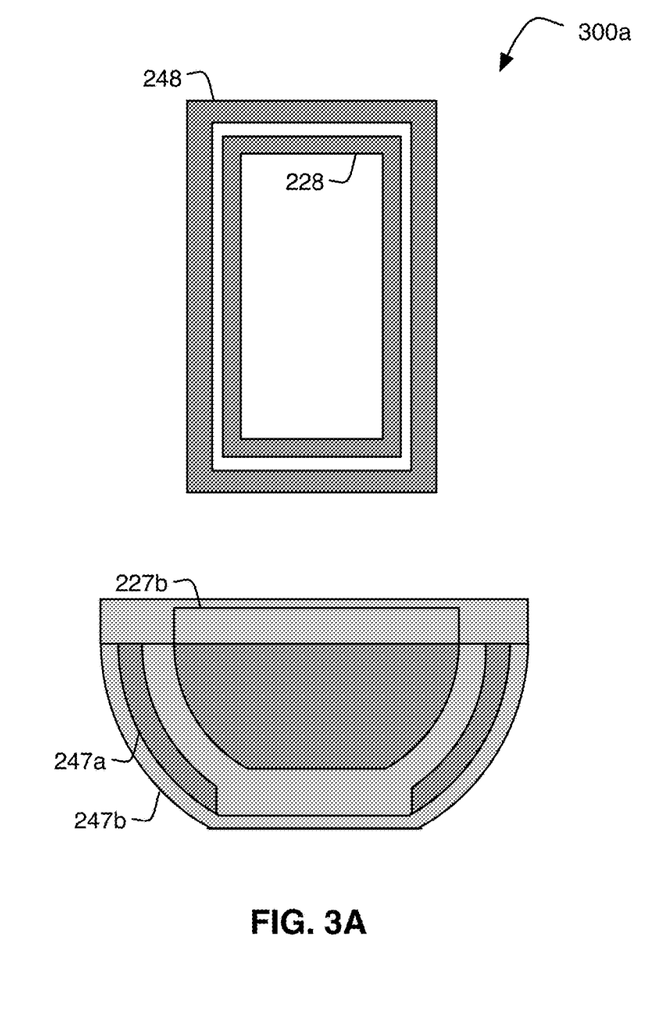
FIGS. 3A-3B illustrate an exemplary wireless power transfer system configuration including communications coils vertically separated from the power coils.
Figure 3B:
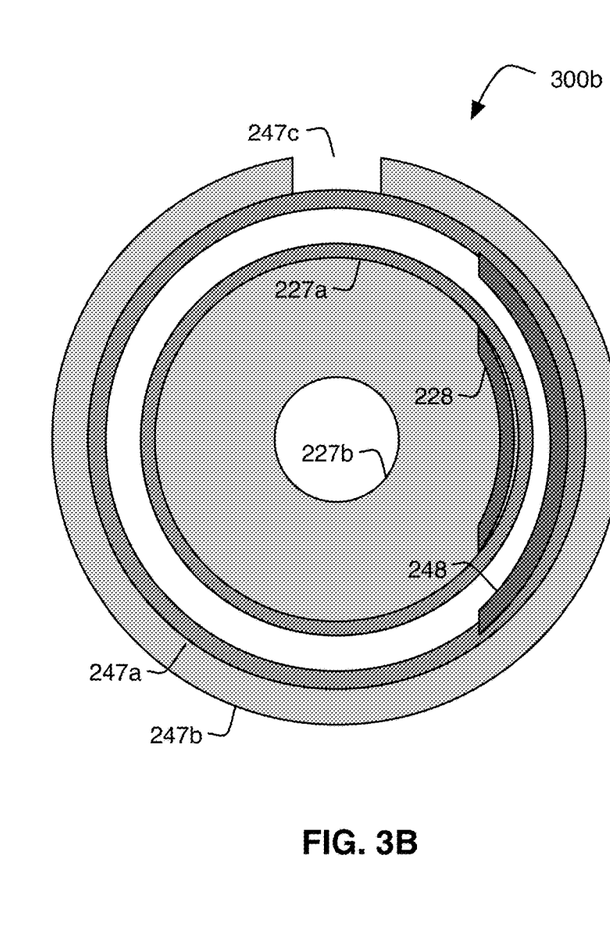

FIGS. 3A-3B illustrate a configuration including communications coils vertically separated from the power coils. More specifically, FIG. 3A includes profile view 300a; and FIG. 3B includes plan view 300b. In the exemplary embodiment, power receiving coil 227 may be disposed in a lower portion of a wireless peripheral. Power receiving coil may include a winding 227a and a magnetic core (a/k/a ferrite) 227b. In the illustrated embodiment, ferrite 227b has a substantially hemispherical shape, and winding 227a is wound in a complementary fashion on the outside of the core. Thus, power receiving coil may have a substantially hemispherical shape, which may correspond to a shape of an end of wireless peripheral 202.

Disposed within the case, a corresponding power transmission coil 247 may be positioned so that when the peripheral is inserted into the case, the power transmission coil 247 is suitably coupled to power receiving coil 227. Wireless power transmission coil 247 may include a winding portion 247a and a magnetic core/ferrite 247b. Magnetic core 247b may be a substantially hemispherical shell so as to correspond to the core of power receiving coil 227. In this case, power transmit winding 227a may be wound on the inside of the hemispherical shell, conforming thereto, so as to form a substantially hemispherical power transmit winding. Thus when the earphone is disposed within the case, the power receiving coil 227 of the earphone may be located substantially within power transmitting coil 247, allowing for a suitable magnetic coupling between the two to facilitate power transfer. Additionally, power transmit coil core 247b may have a slot or air gap 247c disposed therein to facilitate manufacturing of the coil and/or to control magnetic flux, as desired. Additionally, although hemispherical power windings are described in the illustrated embodiments, it will be appreciated that substantially planar coil configurations or other three-dimensional coil configurations could also be used as desired or appropriate for a given embodiment.

The wireless peripheral 202 may also include an earphone communications coil 228, which may be displaced vertically along a longitudinal axis of the stem portion of the wireless earphone so as to be separated from the power coils described above. (This arrangement is also suggested by the block diagram of FIG. 2.) Likewise, charging case 204 may have disposed therein, in a complementary location, case communications coil 248, also displaced from the power coils, thereby providing isolation between the magnetic circuit used for power transmission from the case to the earphones and the magnetic circuit used for communications between the case and the earphones. As illustrated in the views of FIGS. 3A-3B, when the peripheral is positioned within the case, communications coils 228 and 248 may be suitably aligned to provide sufficient magnetic coupling for the desired communications operations.

Figure 4:
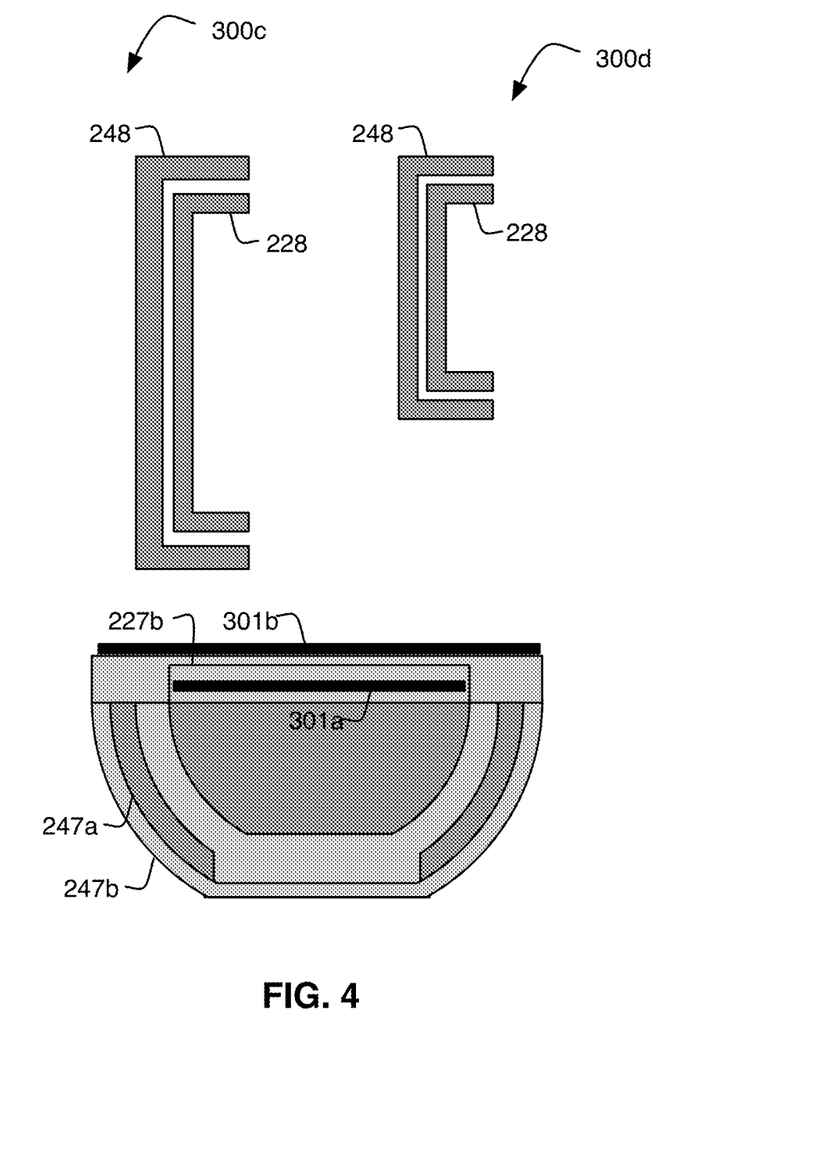
FIG. 4 illustrates a profile view illustrating further optional arrangements of the vertically separated power and communications coils illustrated in FIG. 3A-3B.

FIG. 4 illustrates a profile view (300c) illustrating further optional arrangements of the vertically separated power and communications coils illustrated in FIGS. 3A-3B. Profile view 300c illustrates the arrangement of FIG. 3A-3B with optional shielding 301 provided between the power coils and the communications coils. Shielding 301 may be made of copper or any other conductor and may serve to provide a greater degree of isolation between the power and communications coils than would be provided by vertical separation alone. Thus, the inclusion of shielding can allow for greater magnetic isolation when using the same spacing or may allow for the same degree of magnetic isolation with a lesser spacing. In the illustrated embodiment, a first shield component 301a is disposed in wireless peripheral 202 between the wireless power receiving coil 227 and the vertically separated/displaced communications coil 228. Similarly, a second shield component 301b is disposed in charging case 204 between the wireless power transmitting coil 247 and the vertically separated/displaced communications coil 248. Profile view 300d illustrates, by comparison to profile view 300c, an arrangement in which the height of communications coils 228 and 248 may be reduced so as to provide still further separation, and therefore a higher degree of isolation, between the power and communications coils. The specific dimensions and displacements of the coils may be determined as appropriate for any given embodiment. Additionally, profile view 300d illustrates optional shielding components 301a/301b, but it will be appreciated that the reduced height of the coils may be used together with or apart from this optional shielding, resulting in various permutations of combinations that may be selected depending on the particular performance goals and spatial constraints of a given system.

Figure 5A:
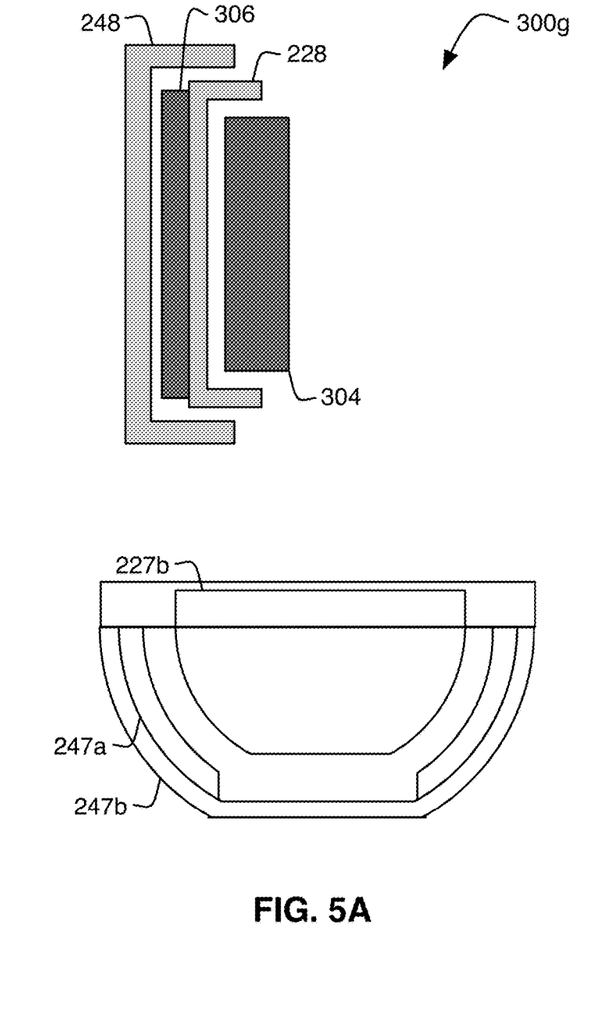
FIGS. 5A-5B illustrate an optional ferrite configuration for the vertically separated/displaced communications coil arrangement discussed above with respect to FIGS. 3A-3B and 4.
Figure 5B:
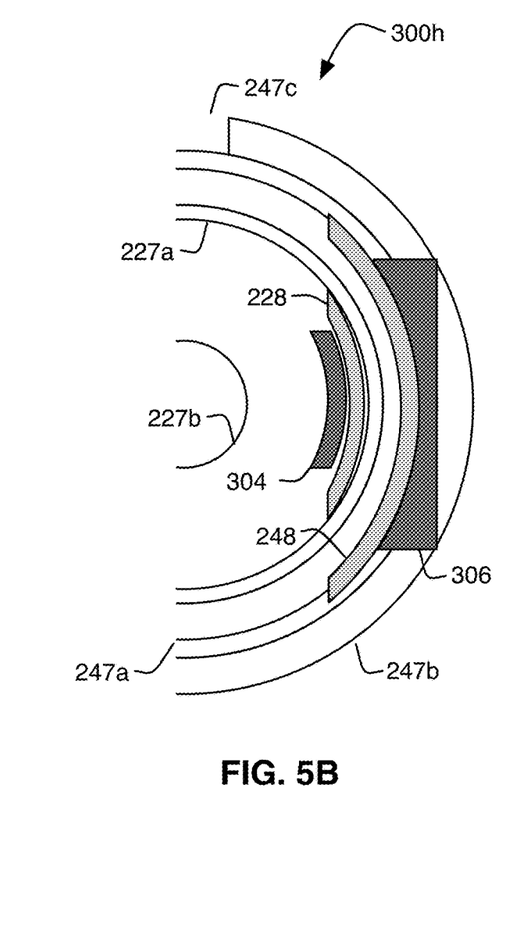

Communications coils 228 and 248 may be constructed without a high-permeability core component (as illustrated in FIGS. 3A-3B); however, in some embodiments, it may be preferable to include magnetic cores to enhance the performance of the communications coils. FIGS. 5A-5B illustrates an optional ferrite configuration for the vertically separated/displaced communications coil arrangement discussed above with respect to FIGS. 3A-B and 4 in two views: FIG. 5A includes a profile view 300e; and FIG. 5B includes a plan view 300f. The power winding arrangements in FIGS. 5A-5B are as illustrated above with respect to FIGS. 3A-3B and 4. Case communications coil 248 may include a core 306, which may be constructed from any material having the desired magnetic permeability, such as a ferrite. Similarly, peripheral communications coil 228 may include a core 304, likewise constructed from a suitable material. These cores may be shaped so as to provide the desired flux paths for a given embodiment. In the illustrated embodiments, the cross-sectional area of the cores are smaller than the cross sectional areas of the corresponding coil windings, and the core may thus be disposed within an aperture of the winding, i.e., such that when looking through the aperture of the winding the coil circumscribes the core. Additionally, the cores may be disposed "behind" the corresponding windings, with earphone core 304 being located towards the interior portion of earphone 202a and case core 306 being located towards an interior portion of case 204. In other words, the winding of earphone communications coil 228 and the winding of case communications coil 248 may face each other, with their respective cores/ferrites behind.

Figure 6A:
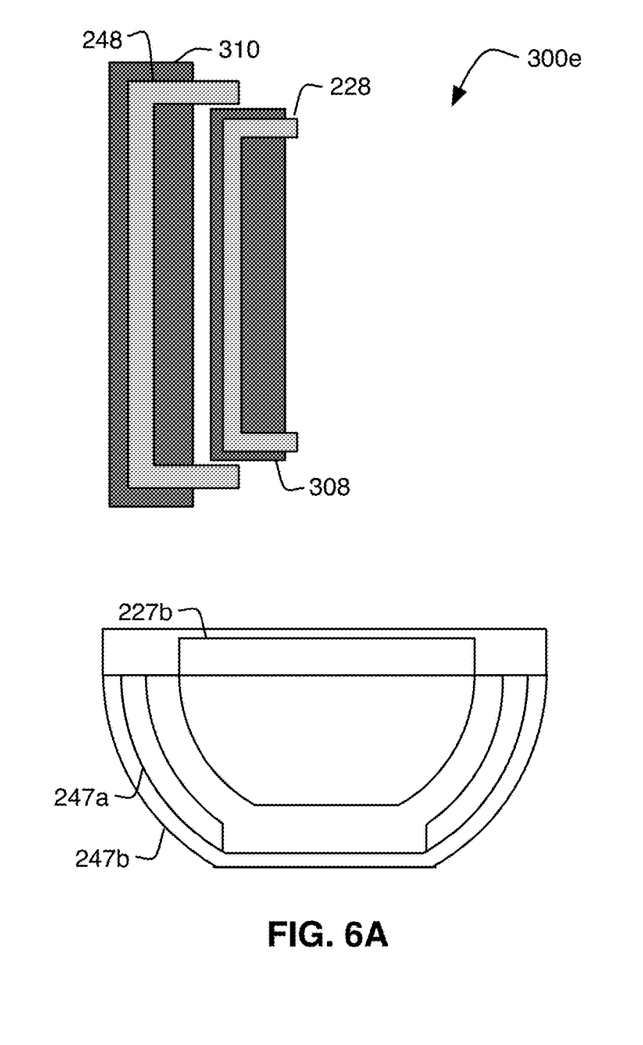
FIGS. 6A-6B illustrate an alternative optional ferrite configuration for the vertically separated/displaced communications coil arrangement discussed above with respect to FIGS. 3A-3B and 4.
Figure 6B:
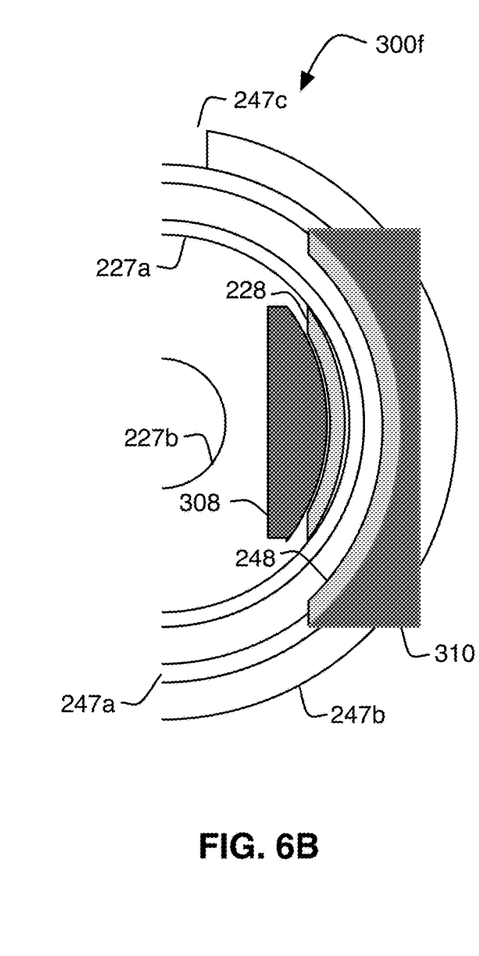

FIGS. 6A-6B illustrate an alternative optional ferrite configuration for the vertically separated/displaced communications coil arrangement discussed above with respect to FIGS. 3A-3B and 4 in two views: FIG. 6A includes a profile view 300g and FIG. 6B includes a plan view 300h. The power winding arrangements in FIGS. 6A-6B are as illustrated above with respect to FIGS. 3A-3B and 4. Case communications coil 248 may include a core 310, which may be constructed from any material having the desired magnetic permeability, such as a ferrite. Similarly, peripheral communications coil 228 may include a core 308, likewise constructed from a suitable material. These cores may be shaped so as to provide the desired flux paths for a given embodiment. In the illustrated embodiments, the cross-sectional area of the cores are larger than the cross sectional areas of the corresponding coil windings. However, as in the embodiment of FIGS. 5A-5B, the cores are still located "behind" the corresponding windings, with peripheral core 308 being located towards the interior portion of peripheral 202 and case core 310 being located towards an interior portion of case 204. In other words, the winding of earphone comms coil 228 and the winding of case comms coil 248 may face each other, with their respective cores/ferrites behind. Additionally, the communications coil arrangements of FIGS. 6A-6B are configured such that a vertical dimension of the communications coil (as illustrated) is less than a horizontal dimension of the communications coil (as illustrated). It will be appreciated that "vertical" and "horizontal" merely refer to direction in the provided diagrams, and need not be vertical, horizontal, or any other particular orientation in an actual embodiment. The terms merely refer to respective orthogonal dimensions of the coils.

Figure 7A:
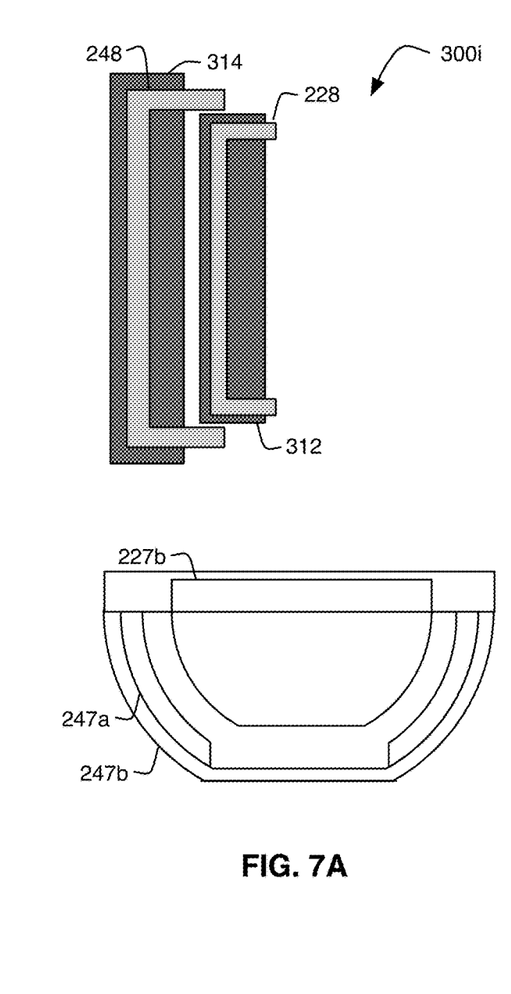
FIGS. 7A-7C illustrate an alternative optional ferrite configuration for the vertically separated/displaced communications coil arrangement discussed above with respect to FIGS. 3A-3B and 4.
Figures 7B, 7C:
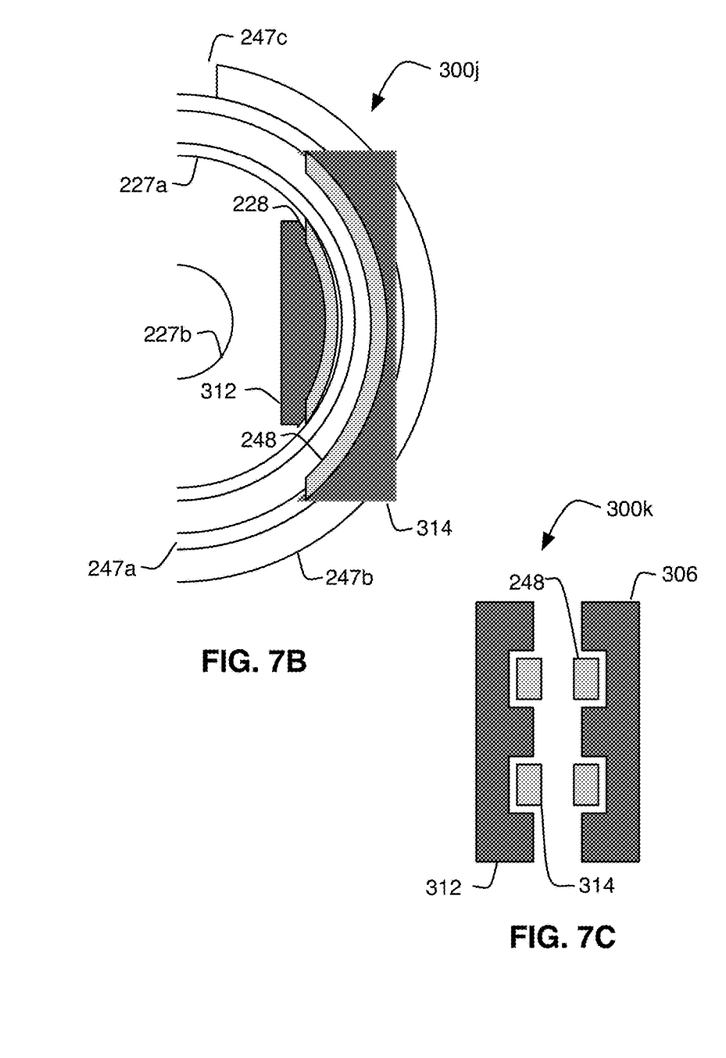

FIGS. 7A-7C illustrate an alternative optional ferrite configuration for the vertically separated/displaced communications coil arrangement discussed above with respect to FIGS. 3A-3B and 4 in three views: FIG. 7A includes a profile view 300i; FIG. 7B includes a plan view 300j; and FIG. 7C illustrates a coil cross section view 300k. The power winding arrangements in FIGS. 7A-7C are as illustrated above with respect to FIGS. 3A-3B and 4. Case communications coil 248 may include a core 314, which may be constructed from any material having the desired magnetic permeability, such as a ferrite. Similarly, peripheral communications coil 228 may include a core 310, likewise constructed from a suitable material. These cores may be shaped so as to provide the desired flux paths for a given embodiment. In the illustrated embodiments, the cross-sectional area of the cores are larger than the cross sectional areas of the corresponding coil windings. Additionally, the windings may be disposed within the cores, such as within channels formed within the cores. However, as in the embodiment of FIGS. 5A-5B, the cores are still located "behind" the corresponding windings, with peripheral core 312 being located towards the interior portion of earphone 202a and case core 314 being located towards an interior portion of case 204. In other words, the winding of peripheral comms coil 228 and the winding of case comms coil 248 may face each other, with their respective cores/ferrites behind. Additionally, the communications coil arrangements of FIGS. 7A-7C are configured such that a vertical dimension of the communications coil (as illustrated) is less than a horizontal dimension of the communications coil (as illustrated). It will be appreciated that "vertical" and "horizontal" merely refer to direction in the provided diagrams, and need not be vertical, horizontal, or any other particular orientation in an actual embodiment. The terms merely refer to respective orthogonal dimensions of the coils.

Various aspects of vertically separated communications coils, as described above with respect to FIGS. 3A-7C, including vertical separation distance, vertical coil extent, shielding, magnetic core presence and configuration, and coil dimensions may be mixed and matched as appropriate in any given application. Thus, there are a wide variety of vertically displaced coil arrangements that may be suitable for any given application depending on the specific objectives and constraints of such a system.

The foregoing describes exemplary embodiments of wireless power transfer systems that provide for isolation between the magnetic circuits used for power transfer and the magnetic circuits used for communications. Such systems may be used in a variety of applications but may be particularly advantageous when used in conjunction with personal electronic devices such as mobile computing devices (e.g., laptop computers, tablet computers, smart phones, and the like) and their accessories (e.g., wireless earphones, styluses and other input devices, etc.) as well as wireless charging accessories (e.g., charging mats, pads, stands, etc.). Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient and non-damaging manner to facilitate battery charging. It is contemplated some implementers of the present technology may consider the passage of identifiers, such as serial numbers, UIDs, manufacturer IDs, MAC addresses, or the like, to aide in the identification of PTx's and PRx's, particularly their wireless capabilities, to one another.

Entities implementing the present technology should take care to ensure that, to the extent any sensitive information is transmitted between wireless transceivers in the above-described embodiments of wireless charging systems, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system, and allow users to "opt in" or "opt out" of participation. For instance, such information may be presented to the user when they place a device onto a power transmitter.

It is the intent of the present disclosure that personal information data, if any, should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A wireless earphone charging case comprising:
a power transmitting coil configured to be magnetically coupled to a power receiving coil of a wireless power receiver;
wireless power transmitting circuitry configured to transmit energy via the power transmitting coil;
a processing and communications system; and
a wireless communications coil coupled to the processing and communications system, the communications coil comprising a winding configured to be magnetically coupled to a corresponding communications coil of the wireless power receiver to allow communications between the processing and communications system and the wireless power receiver;
wherein the wireless communications coil is separated from the power transmitting coil along a longitudinal axis corresponding to a stem portion of a wireless earphone to be received in the wireless earphone charging case; and
wherein the power transmitting coil is located in a portion of the earphone charging case configured to receive a distal end of the stem portion of the wireless earphone.

2. The wireless earphone charging case of claim 1 wherein the earphone charging case includes one or more alignment features configured to position earphones relative to the case for suitable alignment of the coils.

3. The wireless earphone charging case of claim 1 wherein the power transmitting coil comprises a hemispherical shell magnetic core and a winding disposed about an interior of the hemispherical shell.

4. The wireless earphone charging case of claim 3 wherein the power transmitting coil is configured to be disposed about a hemispherical power receiving coil of the wireless power receiver.

5. The wireless earphone charging case of claim 1 further comprising a shield disposed between the power transmitting coil and the wireless communications coil.

6. The wireless earphone charging case of claim 1 wherein at least one of a height of the communications coil and a vertical separation between the communications coil and the power transmitting coil are selected to provide a desired degree of magnetic isolation therebetween.

7. The wireless earphone charging case of claim 1 wherein the communications coil comprises a magnetic core.

8. The wireless earphone charging case of claim 7 wherein the magnetic core has a cross sectional area smaller than a cross sectional area of the winding of the communications coil and the magnetic core is disposed within an aperture of the winding and behind the winding.

9. The wireless earphone charging case of claim 8 wherein the magnetic core has a cross-sectional area greater than the cross-sectional area of the winding of the communications coil and the winding is disposed within a channel in the magnetic core.

10. The wireless earphone charging case of claim 8 wherein a vertical dimension of the communications coil along the longitudinal axis of the stem portion of the wireless earphone is greater than a horizontal dimension of the communications coil transverse to the longitudinal axis of the stem portion of the wireless earphone.

11. The wireless earphone charging case of claim 8 wherein a vertical dimension of the communications coil along the longitudinal axis of the stem portion of the wireless earphone is less than a horizontal dimension of the communications coil transverse to the longitudinal axis of the stem portion of the wireless earphone.

\* \* \* \* \*